Oct. 20, 1936.  E. C. PLANK  2,057,973
TIRE REPAIR JIG
Filed Aug. 22, 1934    2 Sheets—Sheet 1
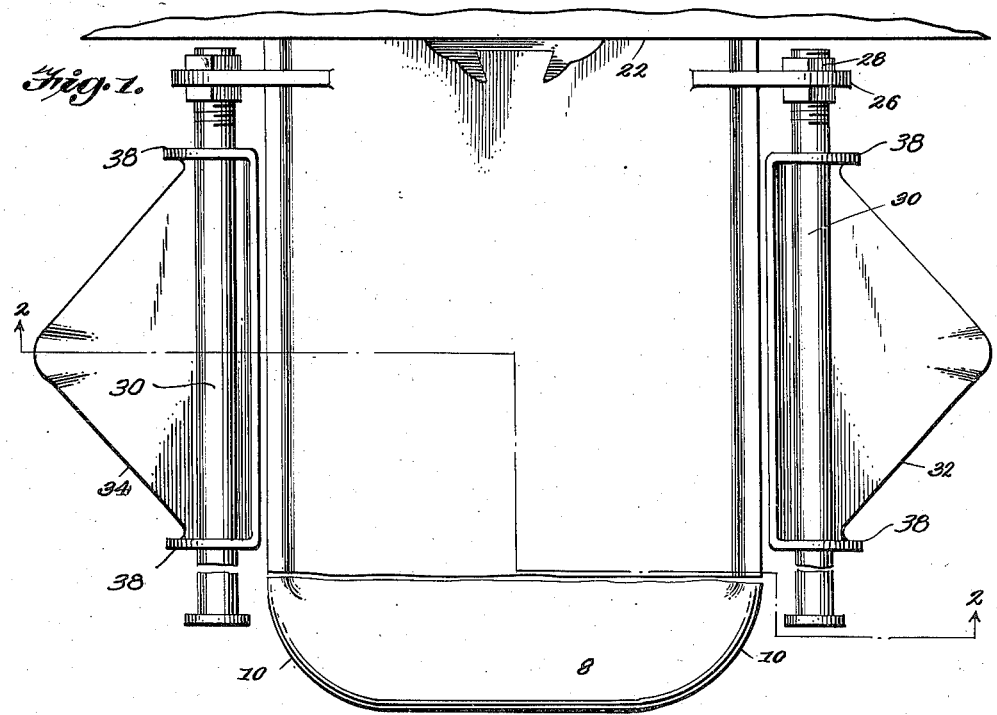
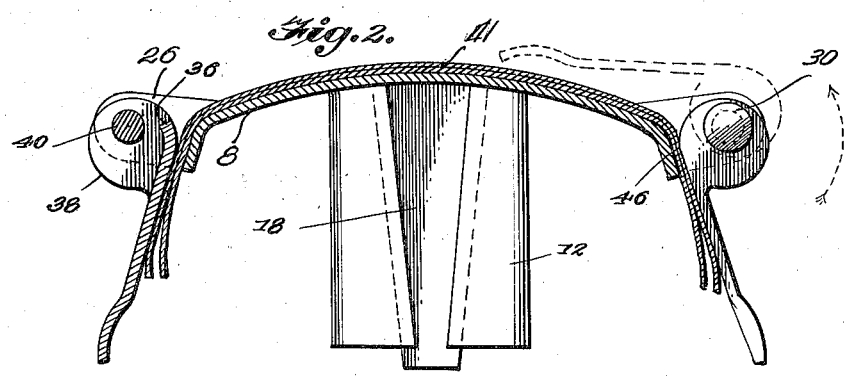
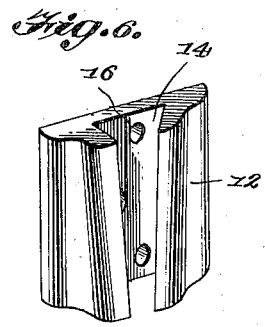
Inventor
Edward C. Plank
By [signature]
Attorney

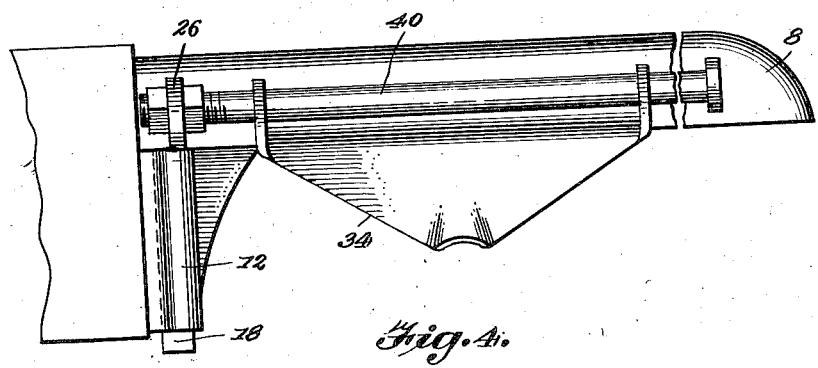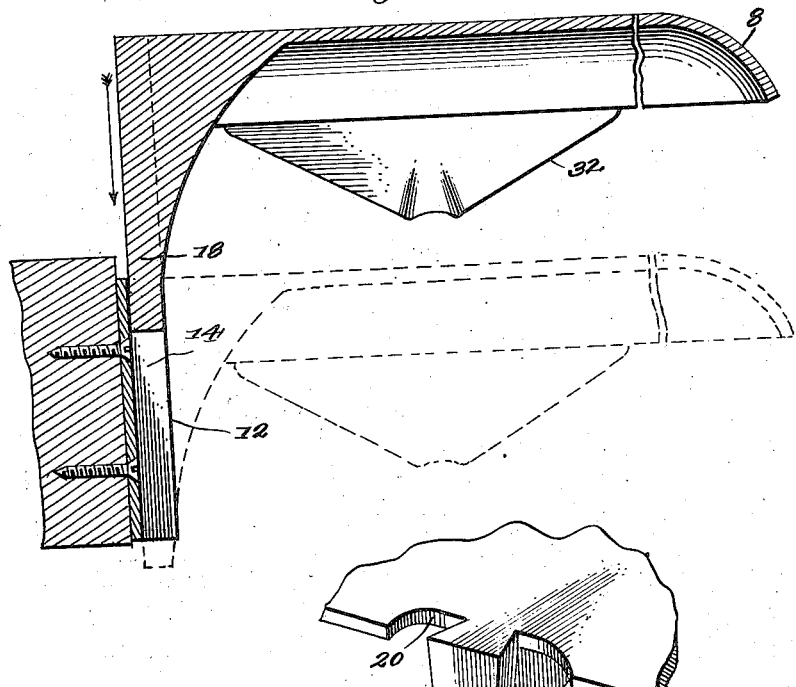

Patented Oct. 20, 1936

2,057,973

UNITED STATES PATENT OFFICE 2,057,973

TIRE REPAIR JIG

Edward C. Plank, Pasadena, Calif.

Application August 22, 1934, Serial No. 741,018

4 Claims. (Cl. 152—27)

The present invention relates to a repair jig and more particularly to a jig of this character especially adapted for use in connection with repairing inner tubes and the like.

One of the objects of the present invention is to provide a tire repair jig which may be secured to a work bench, wall or the like, when using the same, and when not in use may be removed therefrom to the end that it may be conveniently used in shops where there is a minimum space.

A still further important object of the present invention is to provide a novel means of connecting the jig to a wall, bench or the like, so that the jig is removed therefrom it will not interfere with workmen and mechanics when moving along the edge of the bench or wall.

A still further important attribute of the invention is to provide a jig of this character in which an inner tube may be inserted therein and by means of a simple operation automatically secured in position thereon for repairing the tube.

A still further important object of the invention is to provide a device of this character, which will securely hold and maintain an inner tube in a predetermined position for repairing, without creeping or buckling.

Another important object of the invention is to provide a jig of this character which is cheap to manufacture and easy to operate.

In the accompanying drawings, forming a part of this application and in which like numerals designate like parts throughout the same, Figure 1 is a top plan view of the jig, showing the same securely fastened to a bench, wall or the like, Figure 2 is a horizontal sectional view of Figure 1, taken on line 2—2 thereof looking in the direction of the arrows, Figure 3 is a side elevational view, Figure 4 is a longitudinal vertical sectional view of Figure 3, illustrating the manner in which the jig is positioned in and removed from the wall plate, Figure 5 is a fragmentary perspective view of the key attaching structure, and Figure 6 is a perspective view of the bench or wall plate.

In the accompanying drawings, wherein for the purpose of illustration there is shown a preferred embodiment of the invention, the reference numeral 8 generally designates the work table of the jig which as clearly illustrated in Figure 2, is circular in vertical cross-section. The table is shown to be substantially twice as long as it is wide. However, it may be constructed in any size or proportion desired. The outer front corners of the table are rounded and extend downwardly as illustrated at 10, for a purpose to be more fully hereinafter described.

The table is firmly secured to a bench, wall or the like, through the medium of the wall or bench plate 12 which is of rectangular shape, and is provided with a longitudinally extending frustrum shaped rectangular key receiving slot 14 therein. The bench plate is provided with spaced aperture 16 and is secured to a bench or wall through the medium of the screws 18 which extend through the apertures. It is to be noted that the apertures 16 are counter-sunk to the end that the heads of the screws are flush with the inner surface of the bench plate.

Integral with and depending from the rear portion of the table is a key 18 which is of the same configuration as the slot 14 and is adapted as clearly illustrated in Figures 3 and 4 to be received in the slot 14 to the end that the jig will be firmly secured to a wall or bench in a horizontal position.

It will thus be seen that the key is of a length greater than the bench plate, extending or projecting below so that when it is desired to remove the table from the plate, the same can be accomplished by a gentle tapping on the projecting portion of the key. The table is recessed at 20 to conform with the shape of the bench plate to the end that upon entrance of the key into the slot, the inner edges 22 assume a position adjacent the bench or wall.

Adjacent the inner ends of the work bench are integral laterally extending apertured lugs 26 to which there is firmly secured by means of the nuts 28 as illustrated in Figure 1, clutch pins or rods 30. It is to be noted that the clutch pins or rods 30, by virtue of the lateral position of the lugs 26 assume a parallel position with respect to the sides of the work bench. On each of the rods 30 there are pivotally mounted clutches or locking cams 32.

The clutches or locking cams each include a substantially web-shaped handle portion 34 having its forward portion 36 bent upwardly as clearly illustrated in Figure 2, and having on each upper side thereof integral spaced ears 38. The ears are eccentrically apertured at 40 to receive the bolts 30 on which they are pivotally mounted. As clearly illustrated in Figure 2, by virtue of the eccentric mounting of the clutches or cams on the rods 30 the clutches in their uppermost position are sufficiently spaced from the adjacent edge portion of the working table to permit of the easy insertion of an inner tube 41.

It is to be noted in this connection that the lower longitudinal edge portion 46 of the work table is flat for a portion thereof to present a flat surface to the opposed inner surface of the cam when the cam or clutch is in its lowermost locking position.

In operation, the clutches are in their uppermost positions, that is, with the handle portions as clearly illustrated in Figure 2, resting on the top surface of the working table. The inner tube, which is desired to be repaired, is placed over the top of the working table, the depending portions being inserted in the space between the working table and the locking cams. The handles of the clutches are then moved to their lowermost position as shown in Figure 2, and upon a pulling of the depending portions of the inner tube, the clutches firmly grip the tube and secure it in a stretched position on top of the working table.

It will thus be seen that upon release of the depending end portion, the inner tube is held in that position until the clutch handles are raised to their upper or releasing position. After the puncture has been located and the tire is placed in this position on the jig, the inner tube will be firmly and securely held in that position without buckling or creeping thereof, and the puncture may be immediately repaired, or if the mechanic is interrupted he may return to the job without fear of the inner tube becoming released or making it necessary to again locate the puncture.

The work table when not in use may be removed from the bench, and placed in an out-of-the-way position. The jig is not only cheap to manufacture, consisting of only a few essential parts, but is simple in operation.

While there is shown for the purpose of illustration a preferred embodiment of the invention, it is to be specifically understood that it is capable of various changes and modifications without departing from the spirit and scope thereof, and it is intended therefore, that only such limitations shall be imposed thereon, as are indicated in the prior art or in the appended claims.

What is claimed is:

1. A tire repair jig of the class described, comprising a work supporting table, means for securing said table to a vertical support in a horizontal position, and eccentrically mounted cam means on each side of said table for frictionally engaging a tire for securing the same in a predetermined position thereon.

2. A tire repair jig of the class described comprising a work supporting table, means for securing said work supporting table in a horizontal position on a support, spaced parallel rods on each side of said work supporting table, and cams pivotally and eccentrically mounted on said rods for engaging a tire on said table for securing the same in a predetermined position thereon.

3. A tire repair jig of the class described, comprising a work supporting table of arcuate shape in horizontal cross section, spaced laterally disposed apertured ears projecting from each side of said work table, cam supporting rods secured in said ears and being disposed in spaced parallel relation to each side of said table, cams pivotally and eccentrically mounted on each of said rods and adapted in their upper position to be disposed in spaced relation with respect to the adjacent sides of the table and in the lower position to firmly engage and secure a tire in position on said supporting table.

4. A tire repair jig of the class described, comprising a work supporting table, a cam supporting rod spacedly secured to each side of said work table, and eccentrically mounted cams on each of said rods adapted in their upper positions to be disposed in spaced relation with respect to the adjacent sides of the supporting table and in the lower position to firmly engage and secure a tire in position on said supporting table.

EDW. C. PLANK.